Figure 1:
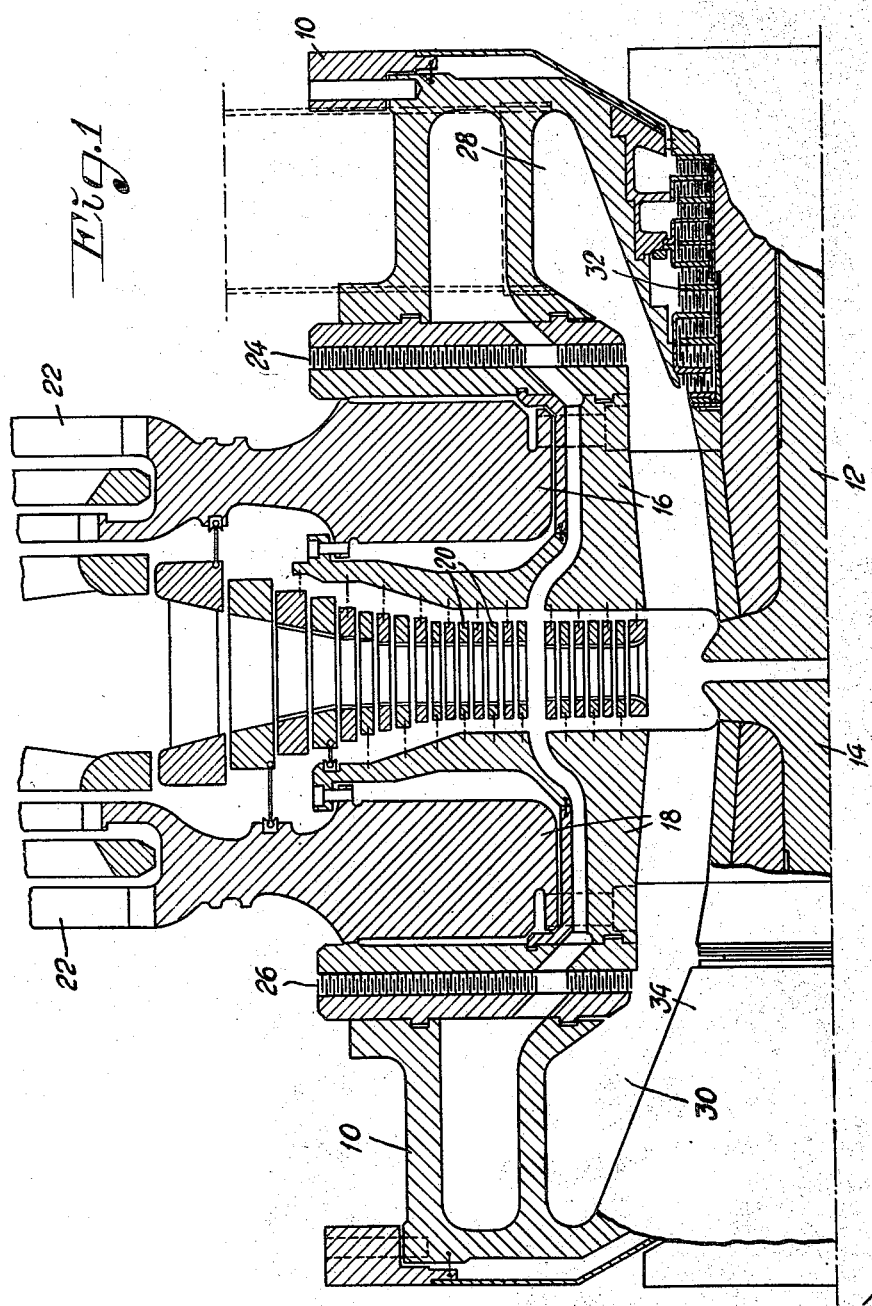

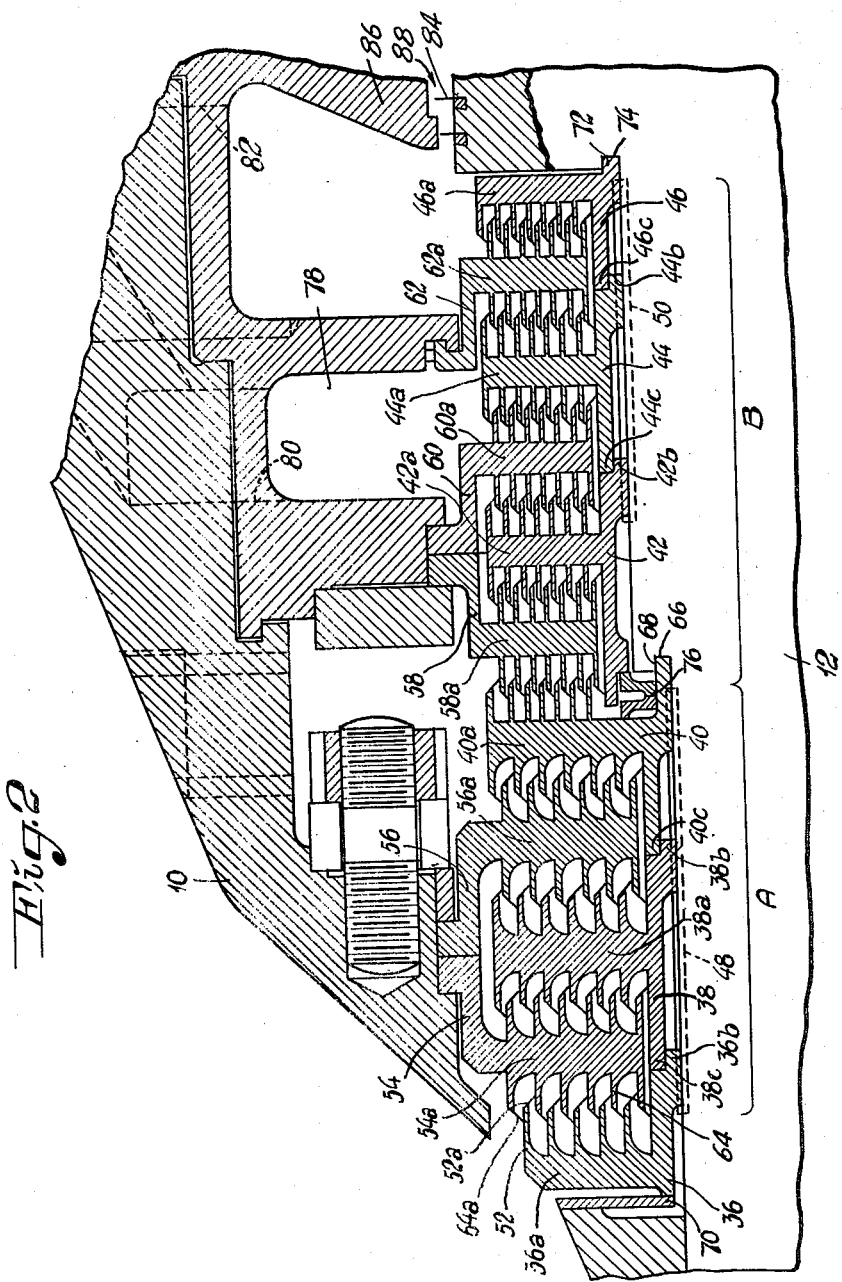

Patented Oct. 15, 1940

2,218,203

UNITED STATES PATENT OFFICE 2,218,203

SHAFT PACKING FOR ELASTIC FLUID TURBINES

Alf Lysholm, Stockholm, Sweden, assignor to Aktiebolaget Ljungströms Ång-turbin, Stockholm, Sweden, a corporation of Sweden Application July 20, 1938, Serial No. 220,175
In Great Britain July 29, 1937

4 Claims. (Cl. 286—10)

The present invention relates to shaft packings for elastic fluid turbines and has particular reference to shaft packings of the type in which a plurality of rotary and stationary packing members are provided with tightening edges.

In packings of the above type as heretofore constructed, and especially in packings for turbines operated with high pressure motive fluid, difficulties have been encountered in maintaining the stationary and rotary packing members with their tightening edges accurately centered so as to prevent direct contact between the tightening surfaces.

The primary object of the present invention is to avoid difficulties heretofore encountered with packings of the kind under consideration and to provide an improved packing construction in which the tightening edges of the cooperating packing members will maintain their proper relative positions during operation of the turbine.

Another object of the invention is to provide means for preventing as far as possible leakage of motive fluid between the turbine shaft and the rotary packing member mounted on the turbine shaft.

The objects of the invention are attained by dividing the packing into a plurality of groups arranged in series with each other, and by so forming the contacting end portions of adjacent packing members that these members are prevented from moving radially relative to each other, as will appear more fully from a consideration of the ensuing portion of this specification, taken in conjunction with the accompanying drawings, which illustrate a preferred form of the invention employed as the shaft packing for a radial flow turbine. It will be understood that packing embodying the invention is not limited in its application to a radial flow turbine, this type of turbine being shown herein merely by way of example.

In the drawings,

Fig. 1 is an axial half section of a radial flow turbine of known type in which shaft packing embodying the present invention is employed, and Fig. 2 is a section on greatly enlarged scale of the shaft packing shown in Fig. 1.

Referring now to the drawings, the turbine comprises stationary structure, a part of which is indicated at 10, in which two axially aligned shafts 12 and 14 are mounted for rotation in opposite directions. The adjacent over-hung ends of these shafts carry built-up rotors indicated respectively at 16 and 18, which rotors have fixed thereto a series of interleaved radial flow turbine blade rings 20 forming a radial flow blade system. In the turbine illustrated, the radial flow blade system exhausts to axial flow blading indicated generally at 22. Between rotor 16 and the stationary structure 10 there is located radially extending labyrinth packing 24 and similar packing 26 is located between the stationary structure and rotor 18. Motive fluid for operating the turbine, which may be either steam or other hot elastic fluid under pressure is admitted to the turbine through the inlet passages indicated at 28 and 30. Leakage of motive fluid from the turbine around the shafts is substantially prevented by the two shaft packings indicated at 32 and 34. Since in the construction illustrated these packings are alike in nature it will be sufficient to describe but one.

Having now particular reference to Fig. 2, the packing 32 comprises two series of three ring like rotary packing members 36, 38, 40 and 42, 44, 46 secured to portions A and B respectively of the shaft 12 by means of keys 48 and 50, respectively. Each of these members has a radially extending portion, 36a, 38a, 40a, 42a, 44a and 46a, respectively, and from these portions there extend axial projections 52 having tightening edges 52a. The diameter of the shaft portion A carrying the rotary packing members of the high pressure packing is smaller than the diameter of the shaft portion B carrying the low pressure packing.

Two series of stationary ring like packing members 54, 56 and 58, 60, 62, having inwardly extending radial portions 54a, 56a and 58a, 60a, 62a, respectively, are secured against rotation in the stationary structure 10. The radial portions of the stationary members have axially extending projections 64 carrying tightening edges 64a adapted to cooperate with the projections 52 on the rotary packing members. The tightening edges 52a on the rotary members cooperate likewise with the stationary projections 64.

In order to reduce leakage of motive fluid through the small clearances which are unavoidable between the shaft key 48 and the adjoining parts of the keyway and packing members, the right-hand end portion 66 of the packing member 40 extends with a tight fit into an annular groove 68 provided in the shaft 12. The tight fit of part 66 in groove 68 also provides for rigid and accurate centering of the packing member 40 and prevents any radial movement of this member relative to the shaft. A spring 70, which in the illustrated embodiment is of the dished washer variety, acts to exert axial compression on the rotary packing members of the high pressure packing to hold them in axially contacting relation on the shaft and to firmly hold the portion 66 of the packing member 40 in contact with the groove 68.

In a similar manner, the right-hand end portion 72 of the rotary packing member 46 extends with a tight fit into an annular groove 74 provided in the turbine shaft 12. The tight fit in groove 74 prevents radial movement of member 46 relative to the shaft. By means of a resilient spring member 76 inserted between the packing member 40 of the high pressure packing and the packing member 42 of the low pressure packing, the packing members of the low pressure packing are pressed towards the right and held in close contact with each other. The tension of the spring 76 is lower than that of the spring 70 so that the portion 66 of the packing member 40 will be held in reliable contact with the groove 68.

Motive fluid entering the inlet end of the packing leaks past the small clearance spaces between the tightening edges and their cooperating projections and leakage fluid which is not previously extracted from the packing as for example through the chamber 78 and passage 80, finally leaves the packing through a passage 82. Tightening ribs 84 are arranged between the shaft and the stationary turbine structure 86 on the outlet side of the packing and the space 88 to the right of these ribs is maintained under air pressure exceeding somewhat the relatively low pressure of the leakage fluid escaping from the outlet end of the shaft packing. This air under pressure prevents leakage fluid from the packing from passing into space 88, which is ordinarily in communication with the shaft bearing. Leakage fluid flowing to the chamber 78 may be conducted for example to heat one of the radial labyrinth packings such as packing 24, or may be exhausted to a low pressure stage in the turbine blading.

In accordance with the present invention the end portions of adjacent rotary packing members which abut are in overlapping contact with each other. In the embodiment illustrated, the ends of rotary members 36, 38, 42, 44 remote from the inlet end of the packing are provided with axially extending projections or flanges 36b, 38b, 42b and 44b respectively, while the ends of members 38, 40, 44 and 46 nearest the inlet end of the packing are provided with axial projections 38c, 40c, 44c and 46c of larger diameter than the flange portions of the members against which they abut. These flanges 38c, 40c, 44c and 46c provide in effect sockets into which fit the projections on the members respective nearer the inlet end of packing, the diameters of the abutting surfaces of the overlapping projections being such that in the cold state of the turbine the packing members can be moved upon each other with a sliding fit.

With the turbine in operation, the motive fluid flowing through the small clearances of the shaft packing will be throttled and its heat content will be substantially the same throughout the length of the packing. The temperature of the packing will consequently decrease relatively slightly from inlet to outlet. On the other hand, the temperature of portions A and B of the turbine shaft 12 will decrease from the inlet toward the outlet end of the packing so that at the outlet end the shaft temperature will be considerably lower than at the inlet end. Thus, while the temperature at the inlet end of the portion A will be substantially the same as the temperature of the axially corresponding portion of the packing there will be a substantial difference between the temperature of the shaft at the outlet end of the packing and the temperature of the axially corresponding portion of the packing. Due to this difference in temperature the inner diameters of the packing members will be progressively greater, compared with the diameter of the turbine shaft at corresponding axial places, from the inlet toward the outlet end of the packing. Due to such difference in diameter the packing members would, if it were not for their overlapping cylindrical projections, be able to move radially relative to the shaft and to come out of axial alignment with each other or, in other words, off center with respect to the axis of rotation of the shaft. Due to the small radial clearance between the tightening edges and their cooperating surfaces, even slight misalignment of the members results in direct contact between the relatively moving packing parts, with consequent overheating and damage thereto.

By forming the members in the manner described this difficulty is avoided. It will be evident that even though the temperature drop through the packing is less than along the shaft, the packing members nearer the inlet of the packing will be heated to a somewhat higher degree than the members further from the inlet. Consequently, during normal operation of the turbine the projection 36b on the packing member 36 nearest the inlet will tend to be at slightly higher temperature than the projection 38c on member 38, with which projection 36b has radial contact. Similarly, the projection 38b on member 38 will tend to be at a slightly higher temperature than the projection 40c on member 40, with which projection 38b has radial contact. Member 40, which by means of its tight fit in the groove 68 is rigidly centered with respect to the turbine shaft, consequently acts as a fixed centering member for member 38, due to the fact that member 38 is at somewhat higher temperature than member 40, the result of this temperature differential being to maintain a tight fit always between the overlapping parts 38b and 40c. Similarly, the member 38 which is rigidly centered by member 40, acts as a rigid centering member for the member 36 which is at somewhat higher temperature than member 38.

In like manner the rigidly held member 46, which is tightly fitted in the groove 74, acts as a centering member for the member 44 which is at somewhat higher temperature, and member 44 in turn acts as a centering member for the member 42.

Live motive fluid which leaks through the small clearances along the key 48 and through the tightening surfaces between 66 and 68 mixes with throttled motive fluid flowing between parts 40a and 58a of the packing, and its pressure will be considerably reduced thereby. Consequently, only low pressure motive fluid will enter the space between the portion B of the turbine shaft and the inner surfaces of the packing members 42, 44, 46 which, therefore, will not be subjected to the pressure of the high pressure motive fluid and thus can be designed with comparatively small dimensions.

If in a shaft packing of the type described a great number of packing members rest against each other at their end surfaces, the small inaccuracies which are not entirely avoidable at the abutting end surfaces of the packing members will sum up to a total amount unpermissible in regard of the small clearances that must be maintained between the tightening edges of cooperating packing members. By dividing the shaft packing into a plurality of groups, as shown in the drawings, each group need not comprise more than a few packing members which can be accurately adjusted so as to maintain their relative positions during the operation of the turbine. By mounting the packing members on shaft portions having different diameters, such diameters can be chosen so that they will suit the conditions required for obtaining the most suitable critical speed of the turbine shaft.

Within the scope of the invention the specific design of the packing members may be varied considerably and the invention is accordingly to be understood as embracing all forms of construction falling within the purview of the appended claims.

What I claim is:

1. In an elastic fluid turbine, a shaft packing having an inlet end and an outlet end including a plurality of packing members rotationally fixed with respect to each other and having end portions providing inter-engaging socket connections between adjacent members for preventing radial movement therebetween, the end portion of each packing member being situated within a socket formed in the next adjacent packing member nearer to said outlet end and of lower temperature.

2. In an elastic fluid turbine, a turbine shaft, stationary turbine structure, and packing for said shaft including a series of ring-like packing members secured for rotation with said shaft and free to expand relative thereto, said members having overlapping cylindrical end portions in inter-engaging contact and the high pressure end portion of each member with the exception of the member at the high pressure end of the packing encircling the low pressure end portion of the adjacent member nearer the high pressure end of the packing, whereby to be radially centered thereby.

3. In an elastic fluid turbine, a turbine shaft, stationary turbine structure and packing for said shaft including a group of ring-like packing members secured for rotation with said shaft but having freedom of axial movement and radial expansion thereon, means for maintaining the member at the low pressure end of the group radially centered with respect to the axis of rotation of the shaft, over-lapping centering portions on said members for radially centering each succeeding member of the group except the member at the low pressure end of the group on the next adjacent member nearer to the low pressure end of the group, said over-lapping centering portions being constructed with the portion of a member nearer the low pressure end of the group overlying the portion of the adjacent member nearer the high pressure end of the group, and means for exerting axial pressure on said members to maintain them in axially contacting relation.

4. In an elastic fluid turbine, a turbine shaft, stationary turbine structure and packing for said shaft including a plurality of groups of ring-like packing members secured for rotation with said shaft and having freedom of axial movement and radial expansion thereon, said shaft having portions of different diameter and each of said groups being secured around a shaft portion of different diameter, means for maintaining the member at the low pressure end of each group of packing members radially centered with respect to the axis of rotation of the shaft, over-lapping cylindrical end portions on said members for radially centering each succeeding member of each group with the exception of the member of the group nearest the low pressure end of the packing on the next adjacent member of the group nearer to the low pressure end of the packing, said over-lapping cylindrical end portions being constructed so that a member nearer the low pressure end of the packing overlies the adjacent member nearer the high pressure end of the packing, and means for exerting axial pressure on each of said groups of members to maintain the members of each group in axially contacting relation.

ALF LYSHOLM.